United States Patent
Yosef et al.

(10) Patent No.: US 11,989,157 B2
(45) Date of Patent: May 21, 2024

(54) TEST ADAPTION AND DISTRIBUTION ACCORDING TO CUSTOMER KNOWLEDGE BASE

(71) Applicant: Dell Products L.P., Round Rock, TX (US)

(72) Inventors: Ilan Yosef, Petach Tiqva (IL); Shay Goldshmidt, Herzliya (IL)

(73) Assignee: Dell Products L.P., Round Rock, TX (US)

( * ) Notice: Subject to any disclaimer, the term of this patent is extended or adjusted under 35 U.S.C. 154(b) by 104 days.

(21) Appl. No.: 17/572,246

(22) Filed: Jan. 10, 2022

(65) Prior Publication Data

US 2023/0222090 A1    Jul. 13, 2023

(51) Int. Cl.
*G06F 16/11*    (2019.01)

(52) U.S. Cl.
CPC .................. *G06F 16/119* (2019.01)

(58) Field of Classification Search
None
See application file for complete search history.

(56) References Cited

U.S. PATENT DOCUMENTS

| | | | |
|---|---|---|---|
| 10,606,901 B1 | 3/2020 | Nair et al. | |
| 10,671,515 B1 * | 6/2020 | Sanghvi | G06F 11/3688 |
| 10,862,737 B1 | 12/2020 | Sade et al. | |
| 10,872,034 B2 | 12/2020 | Lv et al. | |
| 11,030,565 B1 * | 6/2021 | Haberer | G06F 11/3672 |
| 11,169,716 B2 | 11/2021 | Kanjirathinkal et al. | |
| 11,176,464 B1 | 11/2021 | Sagi et al. | |
| 2012/0265726 A1 * | 10/2012 | Padmanabhan | G06F 16/214 707/602 |
| 2013/0110770 A1 * | 5/2013 | Stevelinck | G06F 16/214 707/609 |
| 2014/0310231 A1 * | 10/2014 | Sampathkumaran | G06F 16/254 707/602 |
| 2018/0088926 A1 * | 3/2018 | Abrams | H04L 67/568 |
| 2020/0379892 A1 * | 12/2020 | Velipasaoglu | G06F 11/3692 |
| 2023/0103856 A1 * | 4/2023 | Ender | G06F 11/3692 717/124 |

* cited by examiner

*Primary Examiner* — Thu N Nguyen
(74) *Attorney, Agent, or Firm* — BainwoodHuang

(57) ABSTRACT

Techniques for performing test adaption and distribution for customer storage systems in accordance with a customer knowledge base. The techniques can include sending, by each customer storage system, data to the customer knowledge base. The data includes, for each customer storage system, a version of a data storage application and associated system configuration and parameters. In response to a query from a QA testing system, the data is migrated from the customer knowledge base to a QA database. The QA testing system analyzes the data to determine the most common system configuration, parameters, and data storage application version for most of the customer storage systems. The QA testing system adapts a test plan for testing the data storage application to conform with the most common system configuration and parameters and executes an application upgrade plan on QA storage appliances pre-prepared in accordance with the most common data storage application version.

19 Claims, 6 Drawing Sheets

```
300a ─┐
       ┌─────────────────────────────────────────────────────────────────┐
       │ △▽ │ ⇦ │ https://lab.com/display/QA_HW_pool │ 🔍 │ 🏠 │ 🔑 │
       ├─────────────────────────────────────────────────────────────────┤
302 ─  │ 2022-01-03 23:00:00 INFO [NightInstaller] Free appliances, QA_HW_pool, total - 5
       │ 2022-01-03 23:01:15 INFO [NightInstaller] appliance RT-G0035
304 ─┤ │ 2022-01-03 23:01:17 INFO [NightInstaller] appliance RT-D0184
       │ 2022-01-03 23:01:18 INFO [NightInstaller] appliance RT-D0403
       │ 2022-01-03 23:02:20 INFO [NightInstaller] appliance RT-D0402
       │ 2022-01-03 23:02:21 INFO [NightInstaller] appliance RT-D0404
306 ─  │ 2022-01-03 23:02:25 INFO [NightInstaller] Installing Version 2.0 on the following appliances:
       │ 2022-01-03 23:02:37 INFO [NightInstaller] appliance RT-G0035
       │ 2022-01-03 23:02:57 INFO [NightInstaller] appliance RT-D0184
308 ─┤ │ 2022-01-03 23:03:17 INFO [NightInstaller] appliance RT-D0403
       │ 2022-01-03 23:03:33 INFO [NightInstaller] appliance RT-D0402
       │ 2022-01-03 23:03:53 INFO [NightInstaller] appliance RT-D0404
       └─────────────────────────────────────────────────────────────────┘
```

*Fig. 3a*

TEST ADAPTION AND DISTRIBUTION ACCORDING TO CUSTOMER KNOWLEDGE BASE

BACKGROUND

During the development of a data storage application, quality assurance (QA) personnel typically devise a series of static test cases against which the data storage application may be exercised. A set or collection of such test cases is generally referred to as a test plan or suite, which is triggered for execution each test cycle. The tests in the test cases, as well as the system configurations and parameters employed therein, are typically determined by the QA personnel, or randomly chosen. Having undergone development and testing, the data storage application is released to storage customers in the field who exercise the data storage application in their own system environments.

SUMMARY

QA personnel can run many various test cases during the development of a data storage application. However, there can be a quality gap when results of such testing do not match customer experiences. This is often the case in the development of a data storage application for data storage systems whose size and complexity continue to increase. Such data storage systems can employ different types of hardware, which can include different types and/or numbers of disk drives. Different input/output (IO) protocols can also be required for storage client computers (also referred to herein as "storage client(s)") to connect with such data storage systems, which can have a multitude of different system configurations. Consequently, the system configurations and parameters employed by storage customers in the field may be different from those employed by QA personnel in testing the data storage application, causing a gap in quality that can adversely affect customer satisfaction.

Techniques are disclosed herein for performing test adaption and distribution for customer storage systems in accordance with a customer knowledge base. The disclosed techniques can be employed to close the quality gap between QA testing of data storage applications and customer experiences in the field with those data storage applications. In the disclosed techniques, one or more customer storage systems or appliances can be communicably coupled (e.g., via a network) to the customer knowledge base. Each customer storage system can be configured to include hardware and software for hosting data storage of one or more client applications (e.g., email client applications, file client applications, web client applications) executing on one or more storage clients. The customer knowledge base can be configured as a database (DB) or server computer situated locally to the customer storage system(s) or remotely from the customer storage system(s) (e.g., in the "cloud"). Further, a data storage application development and testing system (also referred to herein as the "QA testing system") can include a QA database and be communicably coupled (e.g., via a network) to the customer storage system(s) and/or the customer knowledge base. The QA database can be situated locally to the QA testing system or remotely from the QA testing system (e.g., in the "cloud"). The QA testing system can also be communicably coupled to a QA pool of hardware resources (also referred to herein as the "QA hardware pool"), which can include a plurality of QA storage appliances configurable for use in testing data storage applications and/or application upgrades. The QA testing system can be employed by QA personnel to develop, test, distribute, and deploy such data storage applications and/or application upgrades to one, some, or all the customer storage systems.

In the disclosed techniques, data can be sent, periodically or on-demand, to the customer knowledge base by each customer storage system. The data can include information pertaining to a system configuration of the customer storage system, as well as parameters of the system configuration employed in the execution of a data storage application. In response to at least one query from the QA testing system, the data (and optionally the schema) maintained by the customer knowledge base can be migrated to the QA database. By analyzing the data migrated to the QA database, the QA testing system can determine the most common system configuration and parameters for most of the customer storage systems. Further, the QA testing system can adapt a test plan for testing the data storage application to conform with the most common system configuration and parameters. Having adapted the test plan, the QA testing system can execute the test plan to test the data storage application, and upon successful testing of the data storage application, distribute and deploy the data storage application to one, some, or all the customer storage systems.

Further in the disclosed techniques, the data sent to the customer knowledge base by each customer storage system can include information indicating the version of the data storage application installed on the customer storage system. In response to at least one query from the QA testing system, the data (including, for each customer storage system, the version of the data storage application and the system configuration and parameters associated therewith) maintained by the customer knowledge base can be migrated to the QA database. By analyzing the data migrated to the QA database, the QA testing system can determine the most common version of the data storage application installed on most of the customer storage systems, as well as the most common system configuration and parameters associated with that version of the data storage application. The QA testing system can also determine which ones of the plurality of QA storage appliances in the QA hardware pool are free and available for use, as well as prepare those QA storage appliances in advance, in accordance with the most common version of the data storage application, system configuration, and parameters. Such preparation of the QA storage appliances in the QA hardware pool can be performed during an overnight idle time of the QA testing system or any other suitable time. Having prepared the QA storage appliances in advance, the QA testing system can test and execute an application upgrade plan (e.g., non-disruptive upgrade (NDU) plan) on the QA storage appliances, and upon successful testing and execution of the application upgrade plan, perform the application upgrade on one, some, or all the customer storage systems.

In some embodiments, a method of performing test adaption and distribution for customer storage systems includes, in response to a query sent to a customer knowledge base by a quality assurance (QA) testing system, migrating data from the customer knowledge base to a QA database. The data is sent to the customer knowledge base by each of a plurality of customer storage systems. The data includes information pertaining to a system configuration of the customer storage system and parameters of the system configuration employed in execution of a data storage application. The method further includes, in response to analysis of the data in the QA database, determining, by the QA testing system, most common system configuration and parameters for most of the plurality of customer storage systems, and adapting, by the QA testing system, a test plan for testing the data storage application to conform with the most common system configuration and parameters. The method further includes, in response to successful testing of the data storage application, distributing the data storage application to one, some, or all the plurality of customer storage systems.

In certain arrangements, the method includes sending, by the QA testing system, the query directly to the customer knowledge base over a network path.

In certain arrangements, the method includes migrating the data directly from the customer knowledge base to the QA database over the network path.

In certain embodiments, a system for performing test adaption and distribution for customer storage systems includes a memory and processing circuitry configured to execute program instructions out of the memory, in response to a query sent to a customer knowledge base, to migrate data from the customer knowledge base to a quality assurance (QA) database. The data is sent to the customer knowledge base by each of a plurality of customer storage systems. The data includes information pertaining to a system configuration of the customer storage system and parameters of the system configuration employed in execution of a data storage application. The processing circuitry is further configured to execute the program instructions out of the memory, in response to analysis of the data in the QA database, to determine most common system configuration and parameters for most of the plurality of customer storage systems, and to adapt a test plan for testing the data storage application to conform with the most common system configuration and parameters. The processing circuitry is further configured to execute the program instructions out of the memory, in response to successful testing of the data storage application, to distribute the data storage application to one, some, or all the plurality of customer storage systems.

In certain arrangements, the processing circuitry is further configured to execute the program instructions out of the memory to send the query directly to the customer knowledge base oven a network path.

In certain arrangements, the processing circuitry is further configured to execute the program instructions out of the memory to migrate the data directly from the customer knowledge base to the QA database over the network path.

In certain arrangements, the QA database is configured to be situated locally to the system.

In certain arrangements, the QA database is configured to be situated remotely from the system.

In certain arrangements, the data migrated from the customer knowledge base to the QA database is contained in a plurality of database tables corresponding to the plurality of customer storage systems, respectively.

In certain arrangements, each of the plurality of database tables includes, for a respective customer storage system from among the plurality of customer storage systems, information pertaining to at least some of (i) an operating system (OS) or hypervisor installed on the respective customer storage system, (ii) a number of volumes employed by the respective customer storage system, (iii) a number of initiators employed by the respective customer storage system, (iv) a hardware (HW) configuration of the respective customer storage system, (v) a size of a storage cluster incorporating the respective customer storage system, and (vi) an input/output (IO) protocol employed by the respective customer storage system.

In certain embodiments, a method of performing test adaption and distribution for customer storage systems includes, in response to a query sent to a customer knowledge base by a quality assurance (QA) testing system, migrating data from the customer knowledge base to a QA database. The data is sent to the customer knowledge base by each of a plurality of customer storage systems. The data includes information indicating a version of a data storage application installed on the customer storage system. The method further includes, in response to analysis of the data in the QA database, determining, by the QA testing system, a most common version of the data storage application installed on most of the customer storage appliances, and identifying, by the QA testing system, one or more QA storage appliances in a QA hardware pool as being free and available for use in testing an upgrade of the data storage application. The method further includes, during an idle time of the QA testing system, preparing the identified QA storage appliances for testing the upgrade of the data storage application in accordance with the most common version of the data storage application, and having prepared the QA storage appliances, testing an application upgrade plan on the QA storage appliances by the QA testing system. The method further includes, in response to successful testing of the application upgrade plan, performing an upgrade of the data storage application on one, some, or all the customer storage appliances.

In certain embodiments, a system for performing test adaption and distribution for customer storage systems includes a memory and processing circuitry configured to execute program instructions out of the memory to, in response to a query sent to a customer knowledge base, migrate data from the customer knowledge base to a QA database. The data is sent to the customer knowledge base by each of a plurality of customer storage systems. The data includes information indicating a version of a data storage application installed on the customer storage system. The processing circuitry is further configured to execute the program instructions out of the memory, in response to analysis of the data in the QA database, to determine a most common version of the data storage application installed on most of the customer storage appliances, and to identify one or more QA storage appliances in a QA hardware pool as being free and available for use in testing an upgrade of the data storage application. The processing circuitry is further configured to execute the program instructions out of the memory, during an idle time of the system, to prepare the identified QA storage appliances for testing the upgrade of the data storage application in accordance with the most common version of the data storage application, and having prepared the QA storage appliances, to test an application upgrade plan on the QA storage appliances. The processing circuitry is further configured to execute the program instructions out of the memory, in response to successful testing of the application upgrade plan, to perform an upgrade of the data storage application on one, some, or all the customer storage appliances.

In certain arrangements, the data migrated from the customer knowledge base to the QA database is contained in a plurality of database tables corresponding to the plurality of customer storage systems, respectively.

In certain arrangements, each of the plurality of database tables includes, for a respective customer storage system from among the plurality of customer storage systems, information pertaining to at least some of (i) an operating system (OS) or hypervisor installed on the respective customer storage system, (ii) a number of volume employed by the respective customer storage system, (iii) a number of initiators employed by the respective customer storage system, (iv) a hardware (HW) configuration of the respective customer storage system, (v) a size of a storage cluster incorporating the respective customer storage system, (vi) an input/output (IO) protocol employed by the respective customer storage system, and (vii) the version of the data storage application installed on the respective customer storage system.

Other features, functions, and aspects of the present disclosure will be evident from the Detailed Description that follows.

BRIEF DESCRIPTION OF THE DRAWINGS

The foregoing and other objects, features, and advantages will be apparent from the following description of embodiments of the present disclosure, as illustrated in the accompanying drawings, in which like reference characters refer to the same parts throughout the different views.

FIG. 3a is a diagram of an exemplary display screen of a QA testing system, illustrating the real-time pre-preparation of a plurality of QA storage appliances in a QA hardware pool for subsequent testing and execution of an application upgrade plan;

DETAILED DESCRIPTION

Techniques are disclosed herein for performing test adaption and distribution for customer storage systems or appliances in accordance with a customer knowledge base. The disclosed techniques can include sending, by each customer storage system, data to the customer knowledge base, in which the data includes information indicating the version of a data storage application installed on the customer storage system and system configuration and parameter information associated therewith. In response to a query from a quality assurance (QA) testing system, the data maintained by the customer knowledge base can be migrated to a QA database.

By analyzing the data in the QA database, the QA testing system can determine the most common version of the data storage application, system configuration, and/or parameters for most of the customer storage systems. The QA testing system can adapt a test plan for testing the data storage application to conform with the most common system configuration and parameters, as well as execute an application upgrade plan on free and available QA storage appliances prepared in advance in accordance with the most common version of the data storage application. In this way, the quality gap can be closed between QA testing of data storage applications and customer experiences in the field with those data storage applications.

Figure 1:
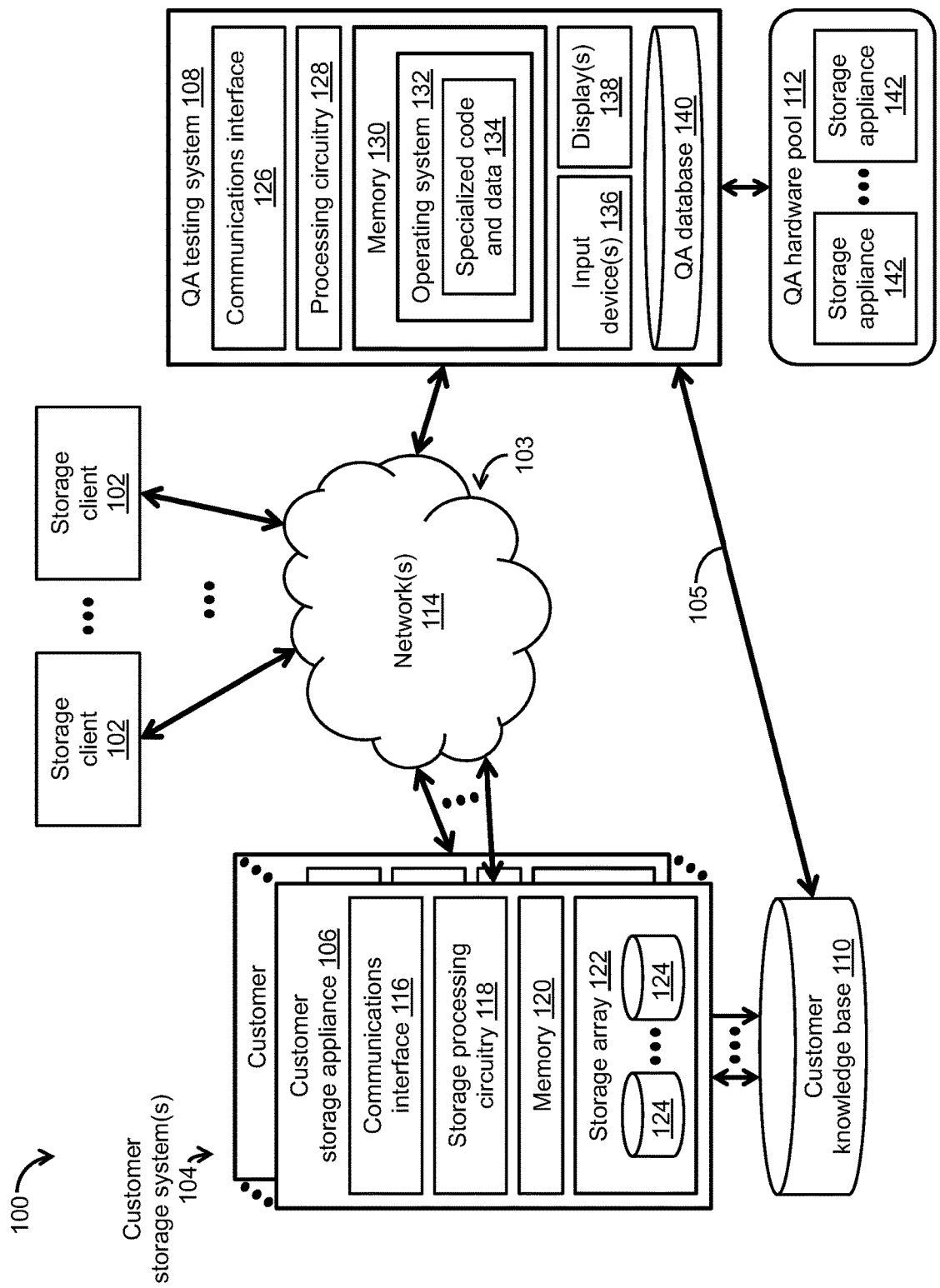
FIG. 1 is a block diagram of an exemplary storage environment for performing test adaption and distribution for customer storage systems or appliances in accordance with a customer knowledge base.

FIG. 1 depicts an illustrative embodiment of an exemplary storage environment 100, in which techniques can be practiced for performing test adaption and distribution for customer storage systems or appliances in accordance with a customer knowledge base. As shown in FIG. 1, the storage environment 100 can include a plurality of storage client computers ("storage client(s)") 102 communicably coupled to one or more customer storage systems 104.1, 104.2, and so on (indicated generally by reference numeral 104) by a communications medium 103 that includes at least one network 114. For example, each of the plurality of storage clients 102 can be configured as an email server computer, a file server computer, a web server computer, and/or any other suitable computer or computerized device. The storage clients 102 can be further configured to provide, over the network(s) 114, storage input/output (IO) requests (e.g., small computer system interface (SCSI) commands, network file system (NFS) commands) to the customer storage system(s) 104. Such storage IO requests (e.g., read requests, write requests) can direct the customer storage system(s) 104 to read and/or write data blocks, data pages, data files, and/or any other suitable data elements from/to storage objects such as volumes (VOLs), logical units (LUs), and/or filesystems on a storage array. Each customer storage system 104 can include one, two, or more customer storage appliances like a customer storage appliance 106. As such, each customer storage system 104 can be configured as either a standalone storage system including, for example, the customer storage appliance 106 or a clustered storage system ("storage cluster") including, for example, two or more such customer storage appliances 106.

The communications medium 103 can be configured to interconnect the storage clients 102 with one, two, or more of the customer storage appliances 106 to enable them to communicate and exchange data and control signaling. As shown in FIG. 1, the communications medium 103 can be illustrated as a "cloud" to represent different network topologies such as a storage area network (SAN) topology, a network attached storage (NAS) topology, a local area network (LAN) topology, a metropolitan area network (MAN) topology, a wide area network (WAN) topology, and so on. As such, the communications medium 103 can include copper-based data communications devices and cabling, fiber optic devices and cabling, wireless devices, and so on, or any suitable combination thereof.

As shown in FIG. 1, the customer storage appliance 106 can include a communications interface 116, storage processing circuitry 118, memory 120, and a storage array 122. The communications interface 116 can include an Ethernet interface, an InfiniBand interface, a Fiber Channel interface, and/or any other suitable communications interface. The communications interface 116 can further include SCSI target adapters, network interface adapters, and/or any other suitable adapters for converting electronic, optical, and/or wireless signals received over the network(s) 114 to a form suitable for use by the storage processing circuitry 118 and memory 120. The storage processing circuitry 118 and memory 120 can be configured to process storage 10 requests (e.g., read requests, write requests) from the respective storage clients 102 and store client data in a redundant array of independent disk (RAID) environment implemented on the storage array 122. The memory 120 can include persistent memory (e.g., flash memory, magnetic memory) and non-persistent cache memory (e.g., dynamic random-access memory (DRAM), static random-access memory (SRAM)) and accommodate a variety of software constructs including operating system (OS) code and data, storage system code and data, and so on. The storage array 122 can be configured to store VOLs, LUs, filesystems, and/or any other suitable storage objects for hosting data storage of client applications (e.g., email client applications, file client applications, web client applications) executing on one or more of the storage clients 102. One, two, or more such customer storage appliances 106 can be communicably coupled (e.g., via a network) to a customer knowledge base 110, which can be configured as a database (DB) or server computer situated locally to the customer storage appliance(s) 106 or remotely from the customer storage appliance(s) 106 (e.g., in the "cloud").

As further shown in FIG. 1, the storage environment 100 can include a data storage application development and testing system (also referred to herein as the "QA testing system") 108. The QA testing system 108 can include a communications interface 126, processing circuitry 128, memory 130, one or more input devices (e.g., keyboard, trackpad, mouse) 136, and one or more user interface (UI) displays 138. The QA testing system 108 can be communicably coupled, via the network(s) 114, to the customer storage appliance(s) 106 and communicably coupled, via a network path 105, to the customer knowledge base 110. The memory 130 can be configured to accommodate an operating system (OS) 132 and specialized code and data 134 for carrying out the techniques and/or methods disclosed herein. The QA testing system 108 can further include a QA database 140, which can be situated locally to the QA testing system 108 or remotely from the QA testing system 108 (e.g., in the "cloud"). The QA testing system 108 can also be communicably coupled to a QA pool of hardware resources (also referred to herein as the "QA hardware pool") 112, which can include a plurality of QA storage appliances 142 configurable for use in testing data storage applications and/or application upgrades. The QA testing system 108 can be employed by QA personnel to develop, test, distribute, and deploy such data storage applications and/or application upgrades to one, some, or all the customer storage appliances 106.

In the context of the processing circuitry 128 being configured to execute code (e.g., program instructions) out of the memory 130, a computer program product can be configured to deliver all, or a portion of the program instructions and data stored and/or maintained on the memory 130 to the processing circuitry 128. Such a computer program product can include one or more non-transient computer-readable storage media, such as a magnetic disk, a magnetic tape, a compact disk (CD), a digital versatile disk (DVD), an optical disk, a flash drive, a solid-state drive (SSD), a secure digital (SD) chip or device, an application specific integrated circuit (ASIC), a field programmable gate array (FPGA), and so on. The non-transient computer-readable storage media can be encoded with sets of program instructions and data for performing, when executed by the processing circuitry 128, the various techniques and/or methods disclosed herein.

During operation, each customer storage system 104 can send, periodically or on-demand, data to the customer knowledge base 110. The data can include information pertaining to the system configuration of the customer storage system 104, the parameters of the system configuration employed in the execution of a data storage application, as well as an indication of the version of the data storage application installed on the customer storage system 104. In response to at least one query from the QA testing system 108, the data (and optionally the schema) maintained by the customer knowledge base 110 can be migrated to the QA database 140. By analyzing the data in the QA database 140, the QA testing system 108 can determine the most common version of the data storage application installed on most of the customer storage systems 104, as well as the most common system configuration and parameters associated with that version of the data storage application. The QA testing system 108 can adapt a test plan for testing the data storage application to conform with the most common system configuration and parameters. Having adapted the test plan, the QA testing system 108 can execute the test plan to test the data storage application, and upon successful testing of the data storage application, distribute and deploy the data storage application to one, some, or all the customer storage systems 104. In addition, the QA testing system 108 can determine which ones of the plurality of QA storage appliances 142 in the QA hardware pool 112 are free and available for use, as well as prepare the QA storage appliances 142 in advance in accordance with the most common version of the data storage application. Such preparation of the QA storage appliances 142 in the QA hardware pool 112 can be performed during an overnight idle time of the QA testing system 108 or any other suitable time. Having prepared the QA storage appliances 142 in advance, the QA testing system 108 can execute an application upgrade plan (e.g., non-disruptive upgrade (NDU) plan) on the storage appliances 142, and upon successful execution of the application upgrade plan, perform the application upgrade on one, some, of all the customer storage systems 104.

The disclosed techniques will be further understood with reference to the following illustrative examples and FIGS. 1, 2a, 2b, 3a, and 3b. In a first example, the QA testing system 108 (see FIG. 1) is employed by QA personnel to dynamically adapt a test plan for testing a data storage application to conform with the most common system configuration and parameters for most of the customer storage systems 104 (see FIG. 1). Such system configuration and parameters for the customer storage systems 104 can include, but are not limited to, (i) the operating systems (OSs) or hypervisors installed on the customer storage systems 104, (ii) the numbers of volumes employed by the customer storage systems 104, (iii) the numbers of initiators employed by the customer storage systems 104, (iv) the hardware (HW) configurations of the customer storage systems 104, (v) the size of the storage clusters incorporating the customer storage systems 104, and (vi) the input/output (IO) protocols employed by the customer storage systems 104. For example, the OS or hypervisor installed on each customer storage system 104 can be the Windows OS, the Red Hat Enterprise Linux (RHEL) OS, the ESXi hypervisor, or any other suitable OS or hypervisor. Further, the initiators employed by the customer storage systems 104 can be host bus adaptors (HBAs) or any other suitable initiators, and the HW configuration of each customer storage system 104 can conform to the hyper-converged infrastructure (HCI), the storage area network (SAN) topology, the network attached storage (NAS) topology, or any other suitable HW configuration. In addition, the IO protocol employed by each customer storage system 104 can be the iSCSI protocol, the NFS protocol, the server message block (SMB) protocol, the common Internet file system (CIFS) protocol, or any other suitable IO protocol. In this first example, each customer storage system 104 sends, periodically or on-demand, data to the customer knowledge base 110, in which the data includes information pertaining to the system configuration and parameters employed in the execution of the data storage application.

Figure 2A:
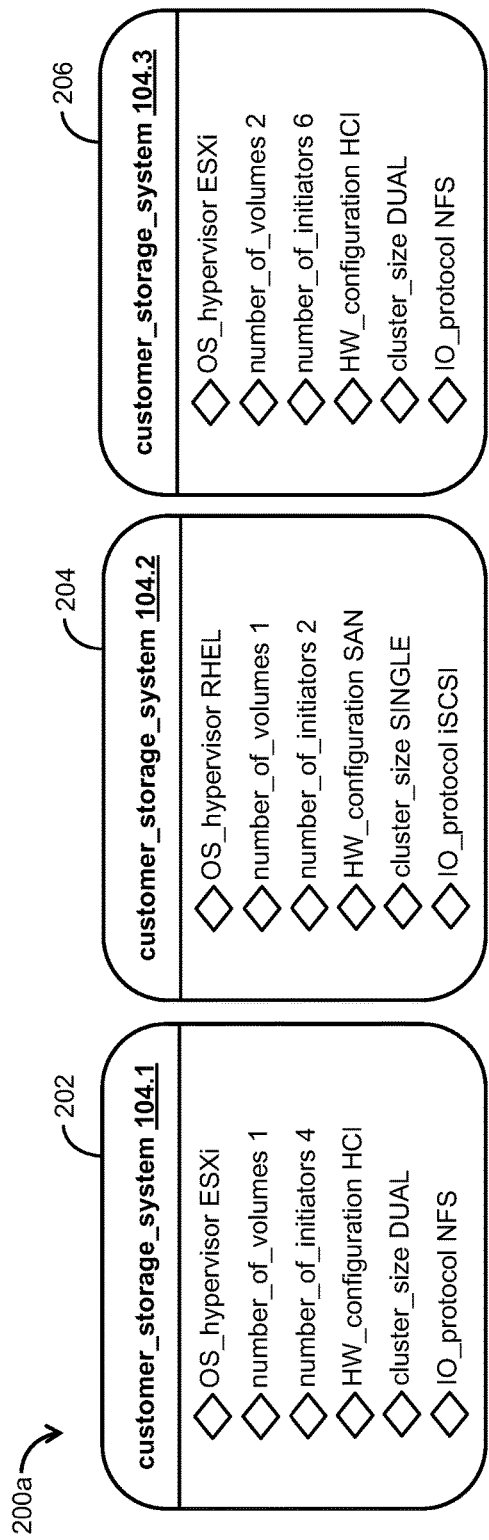
FIGS. 2a and 2b are diagrams of exemplary database (DB) data and schema that can be maintained by the customer knowledge base of FIG. 1 and migrated to a quality assurance (QA) database.

FIG. 2a depicts exemplary database (DB) data and schema 200a that can be maintained by the customer knowledge base 110. As shown in FIG. 2a, the DB data and schema 200a can include a plurality of DB tables 202, 204, 206 for the customer storage systems 104.1, 104.2, 104.3, respectively. The data contained in the DB table 202 includes information pertaining to the system configuration and parameters for the customer storage system 104.1, namely, "OS_hypervisor ESXi", "number_of_volumes 1", "number_of_initiators 4", "HW_configuration HCI", "cluster_size DUAL", and "IO_protocol NFS". The data contained in the DB table 204 includes information pertaining to the system configuration and parameters for the customer storage system 104.2, namely, "OS_hypervisor RHEL", "number_of_volumes 1", "number_of_initiators 2", "HW_configuration SAN", "cluster_size SINGLE", and "IO_protocol iSCSI". The data contained in the DB table 206 includes information pertaining to the system configuration and parameters for the customer storage system 104.3, namely, "OS_hypervisor ESXi", "number_of_volumes 2", "number_of_initiators 6", "HW_configuration HCI", "cluster_size DUAL", and "IO_protocol NFS".

In this first example, the QA testing system 108 sends (e.g., via an API call), periodically or on-demand, a query to retrieve the DB table information for each customer storage system 104.1, 104.2, 104.3 from the customer knowledge base 110 and migrate the DB table information to the QA database 140. In one embodiment, in which the customer knowledge base 110 is configured as a database (DB) system, the QA testing system 108 sends the query directly to the customer knowledge base 110 over the network path 105 and retrieves and migrates the DB table information to the QA database 140 over the network path 105. Further, where the DB schema 200a is flexible, the query can be configured as a NoSQL query. Alternatively, where the DB schema 200a is not flexible, the query can be configured as an SQL query. It is noted, however, that any other suitable DB query for retrieving and migrating the DB table information may be employed. In response to the query from the QA testing system 108, the DB table information for each customer storage system 104.1, 104.2, 104.3 is migrated from the customer knowledge base 110 to the QA database 140.

Once the information from the DB tables 202, 204, 206 has been migrated to the QA database 140, the QA testing system 108 analyzes the information to determine the most common system configuration and parameters for most of the customer storage systems 104.1, 104.2, 104.3. In this first example, among the customer storage systems 104.1, 104.2, 104.3, the most common OS/hypervisor, HW configuration, cluster size, and IO protocol are the ESXi hypervisor, the HCI configuration, the cluster size of two (i.e., dual) customer storage appliances 106, and the NFS protocol, respectively. The QA personnel employ the QA testing system 108 to dynamically adapt a test plan for testing the data storage application to conform with the ESXi hypervisor, the HCI configuration, the cluster size equal to 2, and the NFS protocol. In this way, the QA personnel can obtain a test plan for more efficiently testing most of the customer storage systems 104.1, 104.2, 104.3 within the storage environment 100.

Having adapted the test plan, the QA testing system 108 executes the test plan to test the data storage application. Upon successful testing of the data storage application, the QA testing system 108 distributes and deploys, over the network(s) 114, the data storage application to most of the customer storage systems 104 within the storage environment 100, namely, the customer storage systems 104.1 and 104.3. It is noted that, once the data storage application has been developed, tested, distributed, and deployed to most of the customer storage systems 104, the QA personnel can adapt a test plan for testing the data storage application to conform with the system configuration and parameters for the customer storage system 104.2, as well as any other remaining customer storage system(s) 104 within the storage environment 100.

In a second example, the QA testing system 108 (see FIG. 1) is employed by QA personnel to test and execute an application upgrade (e.g., non-disruptive upgrade (NDU)) plan that conforms with the most common installed version of the data storage application, system configuration, and parameters for most of the customer storage systems 104 (see FIG. 1). As in the first example, each customer storage system 104 sends, periodically or on-demand, data to the customer knowledge base 110, in which the data includes information pertaining to its installed version of the data storage application and the system configuration and parameters employed in the execution of the data storage application.

Figure 2B:
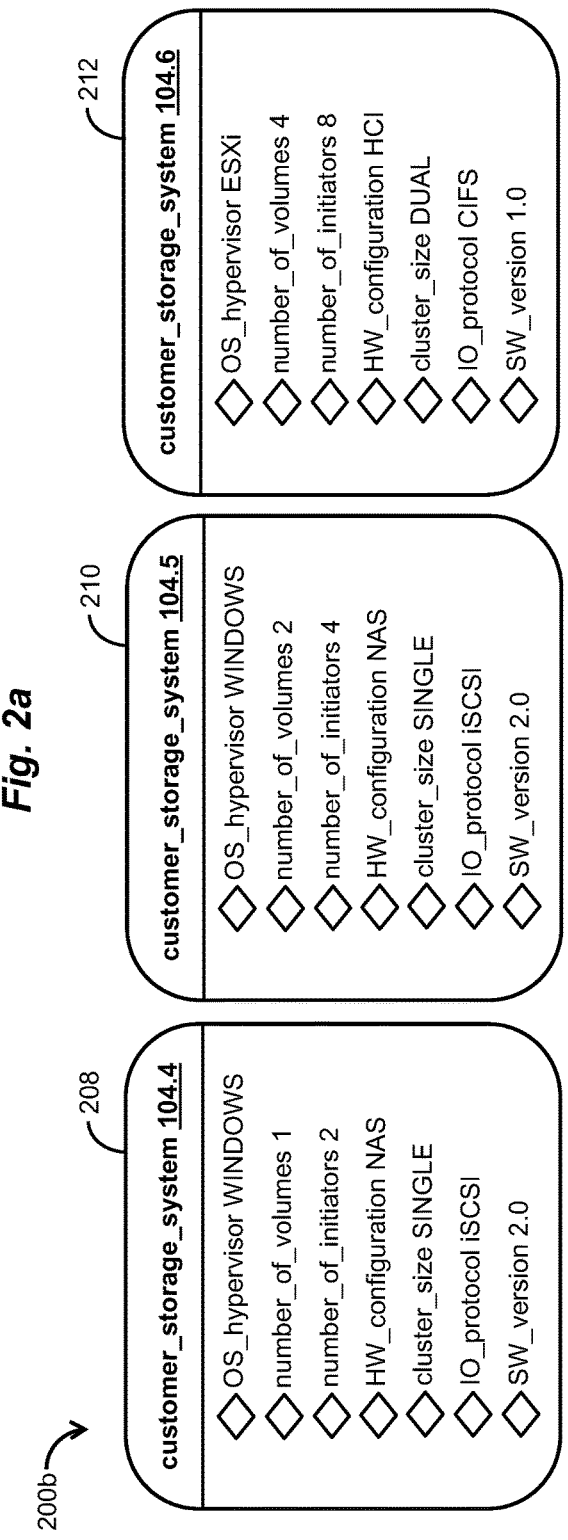

FIG. 2b depicts exemplary database (DB) data and schema 200b that can be maintained by the customer knowledge base 110. As shown in FIG. 2b, the DB data and schema 200a can include a plurality of DB tables 208, 210, 212 for a plurality of customer storage systems 104.4, 104.5, 104.6, respectively. The data contained in the DB table 208 includes information pertaining to the system configuration and parameters for the customer storage system 104.4, namely, "OS_hypervisor WINDOWS", "number_of_volumes 1", "number_of_initiators 2", "HW_configuration NAS", "cluster_size SINGLE", and "IO_protocol iSCSI". The data contained in the DB table 208 further includes information indicating the software version of the data storage application currently installed on the customer storage system 104.4, namely, "SW_version 2.0". The data contained in the DB table 210 includes information pertaining to the system configuration and parameters for the customer storage system 104.5, namely, "OS_hypervisor WINDOWS", "number_of_volumes 2", "number_of_initiators 4", "HW_configuration NAS", "cluster_size SINGLE", and "IO_protocol iSCSI". The data contained in the DB table 210 further includes information indicating the software version of the data storage application currently installed on the customer storage system 104.5, namely, "SW_version 2.0". The data contained in the DB table 212 includes information pertaining to the system configuration and parameters for the customer storage system 104.6, namely, "OS_hypervisor ESXi", "number_of_volumes 4", "number_of_initiators 8", "HW_configuration HCI", "cluster_size DUAL", and "IO_protocol CIFS". The data contained in the DB table 212 further includes information indicating the software version of the data storage application currently installed on the customer storage system 104.6, namely, "SW_version 1.0".

In this second example, the QA testing system 108 sends (e.g., via an API call), periodically or on-demand, a query to retrieve the DB table information for each customer storage system 104.4, 104.5, 104.6 from the customer knowledge base 110 and migrate the DB table information to the QA database 140. As in the first example, the QA testing system 108 can send, over the network path 105, the query directly to the customer knowledge base 110 and retrieve and migrate, over the network path 105, the DB table information to the QA database 140. In response to the query from the QA testing system 108, the DB table information for each customer storage system 104.4, 104.5, 104.6 is migrated from the customer knowledge base 110 to the QA database 140.

Once the information from the DB tables 208, 210, 212 has been migrated to the QA database 140, the QA testing system 108 analyzes the information to determine the most common version of the data storage application installed on most of the customer storage appliances 104.4, 104.5, 104.6, as well as the most common system configuration and parameters associated with that version of the data storage application. In this second example, among the customer storage systems 104.4, 104.5, 104.6, the most common SW version of the data storage application is "2.0". Further, the most common system configuration and parameters associated with version 2.0 of the data storage application are the WINDOWS OS, the NAS configuration, the cluster size of one (i.e., single) customer storage appliance 106, and the iSCSI protocol. The QA personnel employ the QA testing system 108 to determine which ones of the plurality of QA storage appliances 142 in the QA hardware pool 112 are free and available for use, as well as prepare those QA storage appliances 142 (including prefill of a storage array) in advance, in accordance with the most common version of the data storage application, system configuration, and parameters.

FIG. 3a depicts an exemplary display screen 300a for the UI display 138 of the QA testing system 108, illustrating information pertaining to the real-time pre-preparation of the QA storage appliances 142 in the QA hardware pool 112 for subsequent testing and execution of the application upgrade plan. In this second example, such preparation of the QA storage appliances 142 is performed in advance during an overnight idle time of the QA testing system 108. As shown in FIG. 3a, at time 23:00:00 (i.e., hours:minutes:seconds) (see reference numeral 302), the QA testing system 108 determines that there is a total of "5" QA storage appliances 142 free and available for use. Further, at times 23:01:15, 23:01:17, 23:01:18, 23:02:20, and 23:02:21 (see reference numeral 304), the five (5) free and available QA storage appliances are identified with designations "RT-G0035", "RT-D0184", "RT-D0403", "RT-D0402", and "RT-D0404". At time 23:02:25 (see reference numeral 306), the QA testing system 108 initiates the installation of version 2.0 of the data storage application on each of the QA storage appliances RT-G0035, RT-D0184, RT-D0403, RT-D0402, RT-D0404. Further, at times 23:02:37, 23:02:57, 23:03:17, 23:03:33, and 23:03:53 (see reference numeral 308), the installation of version 2.0 of the data storage application on the QA storage appliances RT-G0035, RT-D0184, RT-D0403, RT-D0402, and RT-D0404 is completed.

Having performed the real-time pre-preparation of the QA storage appliances 142 in the QA hardware pool 112, the QA testing system 108 tests and executes the application upgrade (e.g., NDU) plan on the QA storage appliances 142 for upgrading the data storage application from version 2.0 to version 2.1 (or any other latest version). Upon successful testing and execution of the application upgrade plan, the QA testing system 108 performs, over the network(s) 114, the application upgrade from version 2.0 to version 2.1 on most of the customer storage systems 104 within the storage environment 100, namely, the customer storage systems 104.4, 104.5.

Figure 3B:
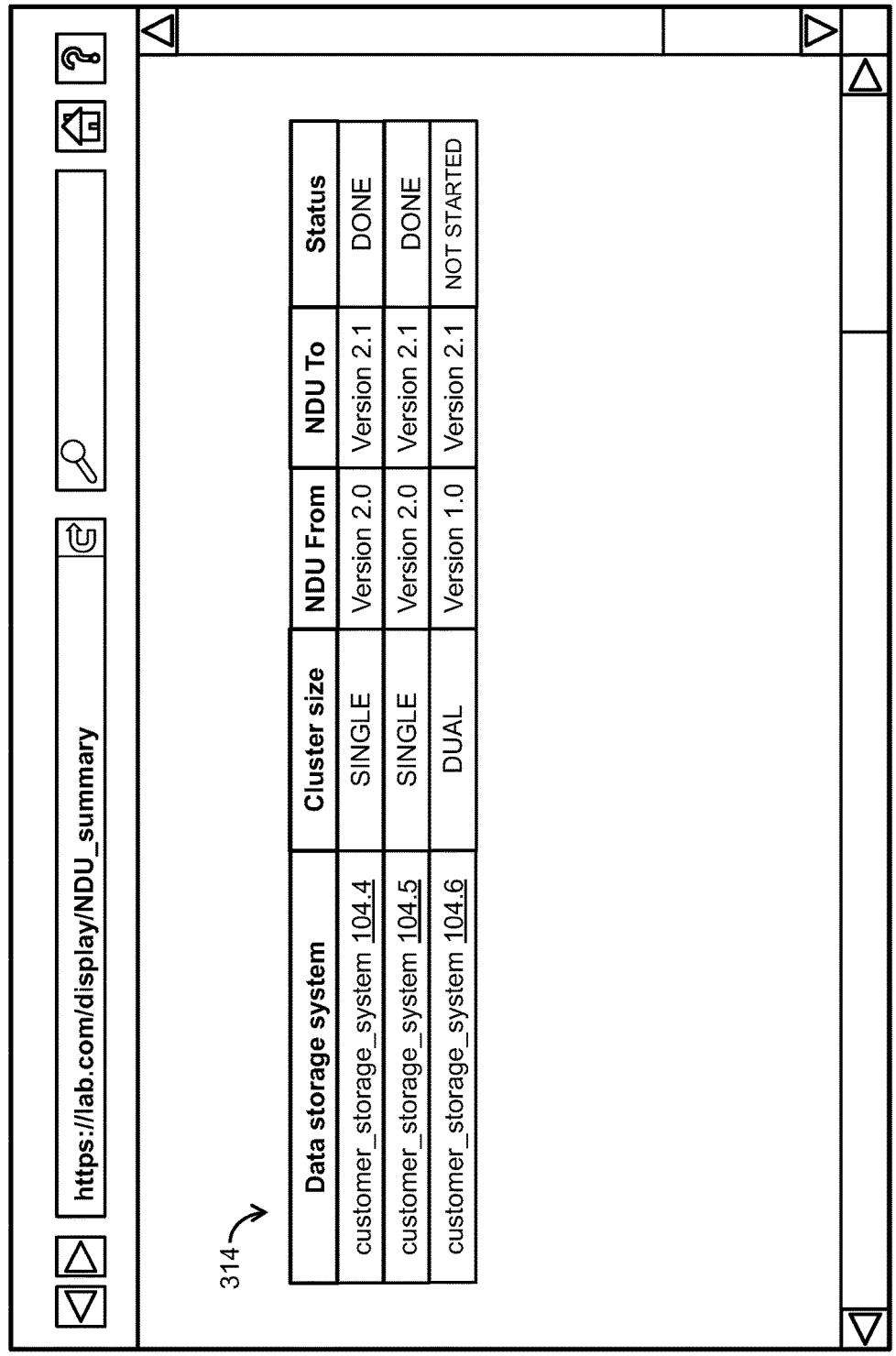
FIG. 3b is a diagram of another exemplary display screen of the QA testing system of FIG. 3a, illustrating a summary of application upgrades performed by the QA testing system on a plurality of customer storage systems.

FIG. 3b depicts an exemplary display screen 300b for the UI display 138 of the QA testing system 108, illustrating a real-time status summary 314 of the application upgrades performed by the QA testing system 108 on the customer storage systems 104.4, 104.5, 104.6. As illustrated in the status summary 314, for the customer storage system 104.4 (cluster size "SINGLE"), the status of the NDU of the data storage application from version 2.0 to version 2.1 is "DONE". Likewise, for the customer storage system 104.5 (cluster size "SINGLE"), the status of the NDU of the data storage application from version 2.0 to version 2.1 is "DONE". However, for the customer storage system 104.6 (cluster size "DUAL"), the status of the NDU of the data storage application from version 1.0 to version 2.1 is "NOT STARTED".

It is noted that, once the application upgrade has been performed and completed on most of the customer storage systems 104 in the storage environment 100, the QA personnel can perform real-time pre-preparation of the QA storage appliances 142 in the QA hardware pool 112 for testing and executing an application upgrade (e.g., NDU) plan for upgrading the data storage application from version 1.0 (or any other previously installed version) to version 2.1 (or any other latest version). Further, upon successful testing and execution of the application upgrade plan, the QA testing system 108 can perform the application upgrade, over the network(s) 114, from version 1.0 to version 2.1 (or any other latest version) on the customer storage system 104.6, as well as any other remaining customer storage system(s) 104 within the storage environment 100. Once the application upgrade from version 1.0 to version 2.1 has been performed on the customer storage system 104.6, the status summary 314 for the customer storage system 104.6 can be updated to change the status from "NOT STARTED" to "DONE".

Figure 4A:
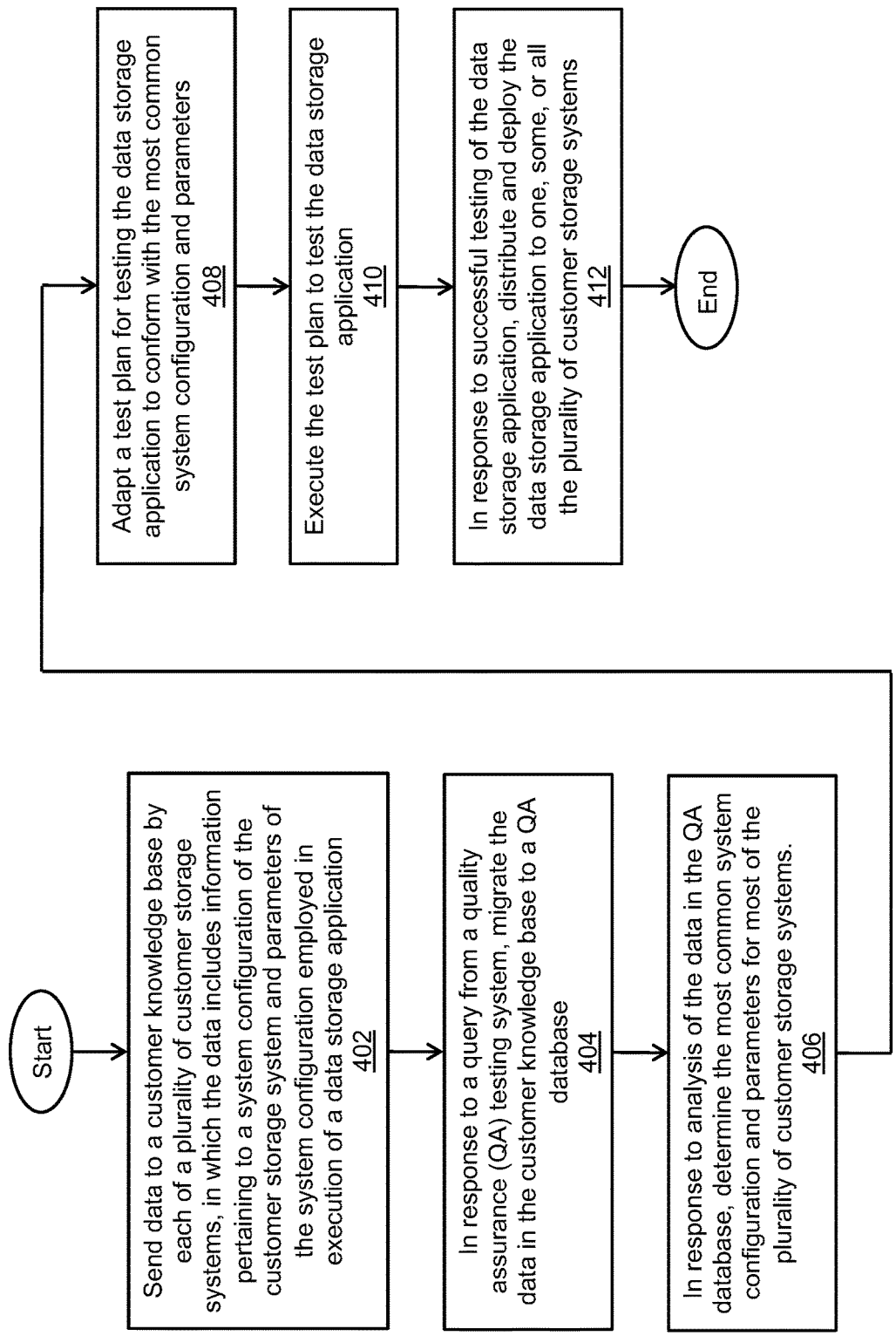
FIG. 4a is a flow diagram of an exemplary method of performing test adaption and distribution for customer storage systems or appliances.

An exemplary method of performing test adaption and distribution for customer storage systems or appliances is described below with reference to FIG. 4a. As depicted in block 402, data is sent to a customer knowledge base by each of a plurality of customer storage systems, in which the data includes information pertaining to a system configuration of the customer storage system and parameters of the system configuration employed in execution of a data storage application. As depicted in block 404, in response to a query from a quality assurance (QA) testing system, the data in the customer knowledge base is migrated to a QA database. As depicted in block 406, in response to analysis of the data in the QA database, the most common system configuration and parameters are determined for most of the plurality of customer storage systems. As depicted in block 408, a test plan for testing the data storage application is adapted, by the QA testing system, to conform with the most common system configuration and parameters. As depicted in block 410, the test plan is executed, by the QA testing system, to test the data storage application. As depicted in block 412, in response to successful testing of the data storage application, the data storage application is distributed and deployed to one, some, or all the plurality of customer storage systems.

Figure 4B:
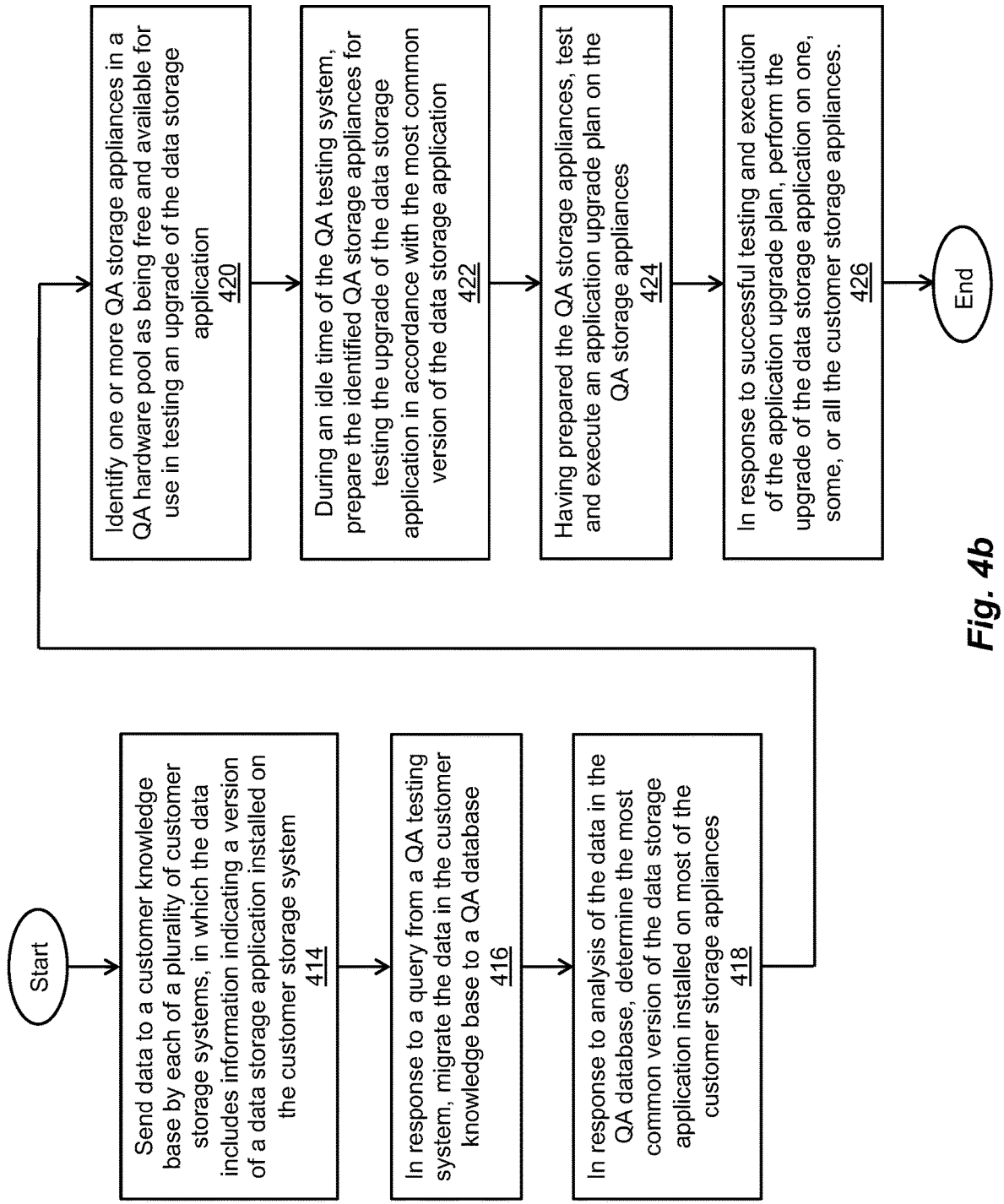
FIG. 4b is a flow diagram of another exemplary method of performing test adaption and distribution for customer storage systems or appliances.

Another exemplary method of performing test adaption and distribution for customer storage systems or appliances is described below with reference to FIG. 4b. As depicted in block 414, data is sent to a customer knowledge base by each of a plurality of customer storage systems, in which the data includes information indicating a version of a data storage application installed on the customer storage system. As depicted in block 416, in response to a query from a QA testing system, the data in the customer knowledge base is migrated to a QA database. As depicted in block 418, in response to analysis of the data in the QA database, the most common version of the data storage application installed on most of the customer storage appliances is determined. As depicted in block 420, one or more QA storage appliances in a QA hardware pool are identified, by the QA testing system, as being free and available for use in testing an upgrade of the data storage application. As depicted in block 422, during an idle time of the QA testing system, the identified QA storage appliances are prepared for testing the upgrade of the data storage application in accordance with the most common version of the data storage application. As depicted in block 424, having prepared the QA storage appliances, an application upgrade plan is tested and executed on the QA storage appliances by the QA testing system. As depicted in block 426, in response to successful testing and execution of the application upgrade plan, the upgrade of the data storage application is performed on one, some, or all the customer storage appliances.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a storage system used for block-based, file-based, or object storage. Storage arrays can include, for example, dedicated storage hardware containing HDDs, SSDs, and/or all-flash drives. A storage entity may be a filesystem, an object storage, a logical unit (LU), a logical unit number (LUN), a logical volume (LV), a virtual volume (VVOL), a logical device, a virtualized device, a physical device, and/or a storage medium. An LU may be a logical entity provided by a storage system for accessing data from the storage system and may be used interchangeably with a logical volume. An LU or LUN may be used interchangeably with each other. A LUN may be a logical unit number for identifying an LU and may also refer to one or more virtual disks or virtual LUNs, which may correspond to one or more virtual machines. A physical storage unit or device may be a physical entity such as a drive or disk or an array of drives or disks for storing data in storage locations that can be accessed by addresses. A physical storage unit or device may be used interchangeably with a physical volume.

As employed herein, the term "storage medium" may refer to one or more storage media such as a hard drive, a combination of hard drives, flash storage, a combination of flash storage, a combination of hard drives, flash storage, and other storage devices, and/or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "IO request" or "IO" may be used to refer to an input or output request such as a data read request or data write request.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of performing test adaption and distribution for customer storage systems, comprising:
   in response to a query sent to a customer knowledge base by a quality assurance (QA) testing system, migrating data from the customer knowledge base to a QA database, the data being sent to the customer knowledge base in a plurality of database tables by a plurality of customer storage systems, respectively, each of the plurality of database tables including, for a respective one of the plurality of customer storage systems, a respective plurality of system configuration parameters employed in execution of a data storage application;
   in response to analysis of the data in the QA database, determining, by the QA testing system, one or more system configuration parameters that occur most often in the plurality of database tables;
   adapting, by the QA testing system, a test plan for testing the data storage application to conform with the one or more system configuration parameters that occur most often in the plurality of database tables; and
   in response to successful testing of the data storage application, distributing the data storage application to one, some, or all the plurality of customer storage systems.

2. The method of claim 1 further comprising:
   sending, by the QA testing system, the query directly to the customer knowledge base over a network path.

3. The method of claim 2 wherein the migrating of the data from the customer knowledge base to the QA database includes migrating the data directly from the customer knowledge base to the QA database over the network path.

4. A system for performing test adaption and distribution for customer storage systems, comprising:
   a memory; and
   processing circuitry configured to execute program instructions out of the memory to:
   in response to a query sent to a customer knowledge base, migrate data from the customer knowledge base to a quality assurance (QA) database, the data being sent to the customer knowledge base in a plurality of database tables by a plurality of customer storage systems, respectively, each of the plurality of database tables including, for a respective one of the plurality of customer storage systems, a respective plurality of system configuration parameters employed in execution of a data storage application;

in response to analysis of the data in the QA database, determine one or more system configuration parameters that occur most often in the plurality of database tables;

adapt a test plan for testing the data storage application to conform with the one or more system configuration parameters that occur most often in the plurality of database tables; and in response to successful testing of the data storage application, distribute the data storage application to one, some, or all the plurality of customer storage systems.

5. The system of claim 4 wherein the processing circuitry is further configured to execute the program instructions out of the memory to send the query directly to the customer knowledge base over a network path.

6. The system of claim 5 wherein the processing circuitry is further configured to execute the program instructions out of the memory to migrate the data directly from the customer knowledge base to the QA database over the network path.

7. The system of claim 4 wherein the QA database is configured to be situated locally to the system.

8. The system of claim 4 wherein the QA database is configured to be situated remotely from the system.

9. The system of claim 4 wherein the respective plurality of system configuration parameters includes at least some of (i) an operating system (OS) or hypervisor installed on the respective one of the plurality of customer storage systems, (ii) a number of volumes employed by the respective one of the plurality of customer storage systems, (iii) a number of initiators employed by the respective one of the plurality of customer storage systems, (iv) a hardware (HW) configuration of the respective one of the plurality of customer storage systems, (v) a size of a storage cluster incorporating the respective one of the plurality of customer storage systems, and (vi) an input/output (IO) protocol employed by the respective one of the plurality of customer storage systems.

10. A method of performing test adaption and distribution for customer storage systems, comprising:

in response to a query sent to a customer knowledge base by a quality assurance (QA) testing system, migrating data from the customer knowledge base to a QA database, the data being sent to the customer knowledge base by each of a plurality of customer storage systems, the data including information indicating a version of a data storage application installed on the customer storage system;

in response to analysis of the data in the QA database, determining, by the QA testing system, a most common version of the data storage application installed on most of the customer storage appliances;

identifying, by the QA testing system, one or more QA storage appliances in a QA hardware pool as being free and available for use in testing an upgrade of the data storage application;

during an idle time of the QA testing system, preparing the identified QA storage appliances for testing the upgrade of the data storage application in accordance with the most common version of the data storage application;

having prepared the QA storage appliances, testing an application upgrade plan on the QA storage appliances by the QA testing system; and in response to successful testing of the application upgrade plan, performing an upgrade of the data storage application on one, some, or all the customer storage appliances.

11. The method of claim 10 further comprising:
sending, by the QA testing system, the query directly to the customer knowledge base over a network path.

12. The method of claim 11 wherein the migrating of the data from the customer knowledge base to the QA database includes migrating the data directly from the customer knowledge base to the QA database over the network path.

13. A system for performing test adaption and distribution for customer storage systems, comprising:

a memory; and processing circuitry configured to execute program instructions out of the memory to:

in response to a query sent to a customer knowledge base, migrate data from the customer knowledge base to a QA database, the data being sent to the customer knowledge base by each of a plurality of customer storage systems, the data including information indicating a version of a data storage application installed on the customer storage system;

in response to analysis of the data in the QA database, determine a most common version of the data storage application installed on most of the customer storage appliances;

identify one or more QA storage appliances in a QA hardware pool as being free and available for use in testing an upgrade of the data storage application;

during an idle time of the system, prepare the identified QA storage appliances for testing the upgrade of the data storage application in accordance with the most common version of the data storage application;

having prepared the QA storage appliances, test an application upgrade plan on the QA storage appliances; and in response to successful testing of the application upgrade plan, perform an upgrade of the data storage application on one, some, or all the customer storage appliances.

14. The system of claim 13 wherein the processing circuitry is further configured to execute the program instructions out of the memory to send the query directly to the customer knowledge base over a network path.

15. The system of claim 14 wherein the processing circuitry is further configured to execute the program instructions out of the memory to migrate the data directly from the customer knowledge base to the QA database over the network path.

16. The system of claim 13 wherein the QA database is configured to be situated locally to the system.

17. The system of claim 13 wherein the QA database is configured to be situated remotely from the system.

18. The system of claim 13 wherein the data migrated from the customer knowledge base to the QA database is contained in a plurality of database tables corresponding to the plurality of customer storage systems, respectively.

19. The system of claim 18 wherein each of the plurality of database tables includes, for a respective customer storage system from among the plurality of customer storage systems, information pertaining to at least some of (i) an operating system (OS) or hypervisor installed on the respective customer storage system, (ii) a number of volume employed by the respective customer storage system, (iii) a number of initiators employed by the respective customer storage system, (iv) a hardware (HW) configuration of the respective customer storage system, (v) a size of a storage cluster incorporating the respective customer storage system, (vi) an input/output (IO) protocol employed by the respective customer storage system, and (vii) the version of the data storage application installed on the respective customer storage system.

\* \* \* \* \*